(12) United States Patent
Kwon

(10) Patent No.: US 10,511,041 B2
(45) Date of Patent: *Dec. 17, 2019

(54) METHOD OF CONTROLLING OPERATION OF FUEL CELL SYSTEM

(71) Applicants: Hyundai Motor Company, Seoul (KR); KIA MOTORS CORPORATION, Seoul (KR)

(72) Inventor: Sang Uk Kwon, Suwon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 633 days.

This patent is subject to a terminal disclaimer.

(21) Appl. No.: 14/542,608

(22) Filed: Nov. 16, 2014

(65) Prior Publication Data

US 2016/0006060 A1 Jan. 7, 2016

(30) Foreign Application Priority Data

Jul. 2, 2014 (KR) .................. 10-2014-0082665

(51) Int. Cl.
*H01M 8/04* (2016.01)
*H01M 8/04664* (2016.01)
(Continued)

(52) U.S. Cl.
CPC ....... *H01M 8/04679* (2013.01); *B60L 3/0053* (2013.01); *B60L 58/33* (2019.02); *B60L 58/40* (2019.02); *H01M 8/04029* (2013.01); *H01M 8/0432* (2013.01); *H01M 8/0435* (2013.01); *H01M 8/0441* (2013.01); *H01M 8/0447* (2013.01); *H01M 8/04291* (2013.01); *H01M 8/04335* (2013.01); *H01M 8/04395* (2013.01);
(Continued)

(58) Field of Classification Search
CPC ......... H01M 8/04291; H01M 8/04335; H01M 8/04589; H01M 8/04522; H01M 8/0441; H01M 8/04649; H01M 8/04859; H01M 8/04731; H01M 8/04723
See application file for complete search history.

(56) References Cited

U.S. PATENT DOCUMENTS 6,087,028 A 7/2000 Goto
2007/0224471 A1* 9/2007 Tanaka .............. H01M 8/04082
429/429

(Continued)

FOREIGN PATENT DOCUMENTS

CN 1930718 A 3/2007
JP 2007-005064 A 1/2007
(Continued)

*Primary Examiner* — Stewart A Fraser
*Assistant Examiner* — Rachel L Zhang
(74) *Attorney, Agent, or Firm* — Mintz Levin Cohn Ferris Glovsky and Popeo, P.C.; Peter F. Corless

(57) ABSTRACT

A method of controlling the operation of a fuel cell system is provided. The method includes diagnosing a water shortage state in a fuel cell stack based on degradation of cooling performance and deterioration of the fuel cell stack and determining a diagnosis level of the fuel cell system based on the diagnosed water shortage state of the fuel cell stack. In addition, a regenerative operation is performed by selecting a regenerative operation mode which corresponds to the determined diagnosis level.

19 Claims, 14 Drawing Sheets

(51) Int. Cl.
*H01M 8/04029* (2016.01)
*H01M 8/0432* (2016.01)
*H01M 8/0444* (2016.01)
*H01M 8/04492* (2016.01)
*H01M 8/04701* (2016.01)
*H01M 8/04791* (2016.01)
*H01M 8/04291* (2016.01)
*H01M 8/0438* (2016.01)
*H01M 8/04537* (2016.01)
*H01M 8/04746* (2016.01)
*B60L 3/00* (2019.01)
*B60L 58/40* (2019.01)
*B60L 58/33* (2019.01)
*H01M 8/1018* (2016.01)

(52) U.S. Cl.
CPC ... *H01M 8/04455* (2013.01); *H01M 8/04492* (2013.01); *H01M 8/04507* (2013.01); *H01M 8/04514* (2013.01); *H01M 8/04522* (2013.01); *H01M 8/04559* (2013.01); *H01M 8/04589* (2013.01); *H01M 8/04649* (2013.01); *H01M 8/04701* (2013.01); *H01M 8/04753* (2013.01); *H01M 8/04798* (2013.01); *B60L 2240/36* (2013.01); *B60L 2260/44* (2013.01); *H01M 8/04768* (2013.01); *H01M 2008/1095* (2013.01); *H01M 2250/20* (2013.01); *Y02T 90/32* (2013.01); *Y02T 90/34* (2013.01)

(56) References Cited

U.S. PATENT DOCUMENTS

| | | | |
|---|---|---|---|
| 2011/0311889 A1 | 12/2011 | Furusawa et al. | |
| 2012/0082912 A1* | 4/2012 | Hyde | H01M 8/04828 429/428 |
| 2016/0006059 A1* | 1/2016 | Kwon | B60L 11/18 429/434 |

FOREIGN PATENT DOCUMENTS

| | | |
|---|---|---|
| JP | 2007-059129 A | 3/2007 |
| JP | 2009-004299 A | 1/2009 |
| JP | 2009-110665 | 5/2009 |
| JP | 2011-113647 A | 6/2011 |
| JP | 2011-249143 A | 12/2011 |
| JP | 2012-003981 A | 1/2012 |
| JP | 2012-043677 A | 3/2012 |
| JP | 2013-239290 A | 11/2013 |
| KR | 10-2005-0084114 | 8/2005 |
| KR | 10-2010-0060430 A | 6/2010 |
| KR | 10-2012-0053137 A | 5/2012 |
| KR | 10-2013-0055113 | 5/2013 |
| WO | 2005/088753 A1 | 9/2005 |

\* cited by examiner

FIG. 2

| | | |
|---|---|---|
| | Flt Lvl 1 MAXIMUM HEAT DISSIPATION PERFORMANCE IS LIMITED | Case1<br>1. REASON : MALFUNCTIONING OF COMPONENTS OF COOLING SYSTEM OR WHOLE COOLING SYSTEM<br>2. DETECTION METHOD : MALFUNCTIONING OCCURRENCE INFORMATION OF COOLING SYSTEM (WATER PUMP, RADIATOR FAN, AND THERMOSTAT) |
| | | Case2<br>1. REASON : ENVIRONMENTAL FACTORS (RISE IN OUTSIDE TEMPERATURE, UPHILL DRIVING)<br>2. DETECTION METHOD : SENSOR VALUE OF OUTSIDE TEMPERATURE, UPHILL DRIVING ANGLE, DRIVING SPEED |
| | | Case3<br>1. REASON : ABOVE TWO SITUATIONS CANNOT BE RECOGNIZED<br>2. DETECTION METHOD : DEGREE OF EXPOSURE TO HIGH TEMPERATURE BASED ON CURRENT CONSUMPTION, ESTIMATION OF REMAINING WATER IN STACK |
| Flt SEVERITY HIGH ↓ | Flt Lvl 2 (HEAT VALUE IS INCREASED DUE TO DETERIORATION OF STACK) | 1. REASON : WATER SHORTAGE IN FUEL CELL HAS ALREADY OCCURRED<br>2. DETECTION METHOD : IV CURVE, SLOPE/ DEFLECTION, IMPEDANCE, CI MEASUREMENT |

METHOD OF CONTROLLING OPERATION OF FUEL CELL SYSTEM

CROSS REFERENCE TO RELATED APPLICATION

The present application claims priority to Korean Patent Application No. 10-2014-0082665, filed Jul. 2, 2014, the entire contents of which is incorporated herein for all purposes by this reference.

TECHNICAL FIELD

The present invention relates to a method of controlling the operation of a fuel cell system, and more particularly to a method of controlling the operation of the fuel cell system that performs different regenerative operations according to respective states of a fuel cell stack.

BACKGROUND

A fuel cell system is used for a Fuel Cell Electric Vehicle (FCEV), which is a type of environmentally-friendly vehicle. The fuel cell system typically includes: a fuel cell stack which generates electric energy from an electrochemical reaction of reaction gases; a hydrogen feeding device which supplies hydrogen gas used as fuel to the fuel cell stack; an air feeding device which supplies air including oxygen used as an oxidizing agent in the electrochemical reaction; and a heat-and-water management system which maintains the optimum operation temperature of the fuel cell stack by dissipating heat from the electrochemical reaction in the fuel cell stack and performs water management.

The fuel cell system is supplied with hydrogen gas and air from an external source and an electrochemical reaction of hydrogen and oxygen occurs in the fuel cell stack of the fuel cell system. During the electrochemical reaction, water is produced from the electrochemical reaction, and the volume of water fluctuates as the water changes into water vapor, saturated liquid, or ice, depending on real-time operating conditions such as temperature and pressure. In other words, water passage may be changed. In addition, the fluctuating volume of water may also influence the channel in a separator, a gas diffusion layer, a catalyst layer, and gases and electrons as water travels through an electrolyte membrane. The fluctuations in the volume of water may result in a flooding state where water overflows in the fuel cell stack or a dehydrated state where water to hydrate the fuel cell stack is insufficient. Particularly, to prevent dehydration, it is necessary to prevent the fuel cell stack from being exposed to high temperature operating conditions, and thus, sufficient cooling may be required.

When the maximum heat dissipation rate of the fuel cell system is reduced due to environmental factors such as a substantially high exterior temperature, an uphill driving condition of a vehicle or other factors such as the failure of cooling components such as a cooling water pump, a cooling fan, a thermostat, and the like; the output current of the fuel cell stack is reduced to maintain the operating temperature of the fuel cell stack at maximum limitation.

In the related art, a conventional technology provides a method of adjusting the temperature of a fuel cell system. For example, the method controls a water pump and a radiator fan to reduce a temperature difference in an inlet and an outlet of a fuel cell stack to a specific temperature range using a temperature distribution detection unit and a load state detection unit.

In another example, a conventional technology provides a control method that includes: segmenting a temperature range of temperatures of cooling water in an outlet of a fuel cell stack into a plurality of classes; setting a target rotating speed for each class; performing a Proportional-Integral (PI) control with respect to rotating speeds of a cooling water pump and a cooling fan based on a detected temperature of cooling water in the outlet of the fuel cell stack such that the temperature of the cooling water in the outlet reaches the target temperature; performing a feed forward control based on a heat value of the fuel cell stack; and adjusting the rotating speeds of the cooling water pump and the cooling fan using a maximum value among values used in the PI control and the feed control.

The foregoing is intended merely to aid in the understanding of the background of the present invention, and is not intended to mean that the present invention falls within the purview of the related art that is already known to those skilled in the art.

SUMMARY

Accordingly, the present invention provides technical solutions to the above mentioned technical difficulties in the related art. In one aspect, a method of controlling the operation of a fuel cell system is provided. The method may prevent deterioration of a fuel cell stack by predicting deterioration of the fuel cell stack and regenerate the fuel cell stack when the fuel cell stack is deteriorated.

In an exemplary embodiment, the method of controlling the operation of a fuel cell system may include: a water shortage state in a fuel cell stack based on degradation in cooling performance and deterioration of the fuel cell stack; determining a diagnosis level of the fuel cell system based on the determined water shortage state of the fuel cell stack; and performing a regenerative operation by selecting any one of the regenerative operation modes. In particular, the selected regenerative operation mode may be determined according to the determined diagnosis level.

In the diagnosing of the fuel cell system, a first state may be determined as Diagnosis Level 1 when the fuel cell system is in the first state where water shortage may occur due to degradation in cooling performance. The first state may also include a state where water shortage in the fuel cell stack, due to failure in a cooling system, is predicted. In addition, the first state may be a state where an operating temperature of the fuel cell system is about equal to or greater than a predetermined reference temperature and where failure of the cooling system continues for about a predetermined period of time or longer.

Moreover, the first state may include a state where a water shortage in the fuel cell stack may occur due to increase or decrease in a temperature or an air flow rate of a draft. Further, the first state may be a state where at least any one factor among a driving speed, an uphill driving angle, and an exterior temperature of a fuel cell vehicle is continuously greater or less than its predetermined reference value for a predetermined period of time.

The first state may also be a state where the driving speed may be continuously less than a first reference driving speed for the predetermined period of time, or the uphill driving angle may be continuously greater than a first reference uphill driving angle for the predetermined period of time, or the exterior temperature may be continuously greater than a first reference outside temperature for the predetermined period of time. The first state may be determined when value calculated using a reference current of the fuel cell stack and a measured current of the fuel cell stack is greater than a first reference value. The reference current may be obtained according to a temperature of the fuel cell stack and the measured current which may be an actual current output from the fuel cell stack.

In particular, the reference current may increase with the temperature of the fuel cell stack. The first state may be determined based on a change in the amount of remaining water on a cathode side. The amount of change may be calculated using an estimated value of relative humidity on the cathode side of the fuel cell stack. The estimated value of relative humidity on the cathode side of the fuel cell stack may be calculated based on temperatures in an inlet and an outlet on the cathode side of the fuel cell stack, an air flow rate in an inlet of the fuel cell stack, and a production current which is output from the fuel cell stack.

The change in the amount of remaining water may also be calculated using flow rates of water vapor in an outlet on the cathode side, respectively, when the relative humidity in the outlet on the cathode side is the estimated value, and when the relative humidity in the outlet on the cathode side is within a range of from about 90% to about 110%. The flow rate of water vapor in the outlet on the cathode side may be calculated using a water vapor pressure in the outlet on the cathode side, an air pressure in the outlet on the cathode side which depends on an air flow rate in an inlet of the fuel cell stack, and the air flow rate in the inlet of the fuel cell stack.

The determination of the diagnosis level of the fuel cell system may include determining a second state as Diagnosis Level 2. In the second state, a heat value of the fuel cell stack may increase due to deterioration of the fuel cell stack, and the deterioration of the fuel cell stack may be caused by water shortage. The deterioration of the fuel cell stack may be determined using a voltage-current curve of the fuel cell stack or an impedance or current interrupt method. Further, in the performing of the regenerative operation, the regenerative operation mode may include: a first regenerative operation mode for reducing the operating limit temperature of the fuel cell stack; a second regenerative operation mode for increasing an air pressure on the cathode side of the fuel cell stack or reducing an air stoichiometric ratio; and a third regenerative operation mode for reducing a hydrogen gas pressure on an anode side of the fuel cell stack or increasing a hydrogen stoichiometric ratio.

In the performing of the regenerative operation when Diagnosis Level 1 is determined, the regenerative operation may be performed while changing an intensity of the regenerative operation in the selected regenerative operation mode. In the performing of the regenerative operation when Diagnosis Level 2 is determined, the regenerative operation may be performed by increasing the intensity of the regenerative operation to an allowable maximum value in the selected regenerative operation mode.

When the regenerative operation is performed in the first regenerative operation mode for reducing the operating limit temperature of the fuel cell stack, the operating limit temperature may be changed according to the determined diagnosis level. When the regenerative operation is performed in the second regenerative operation mode for increasing the air pressure on the cathode side or reducing the air stoichiometric ratio, an increased amount in the air pressure on the cathode side or a decreased amount in the air stoichiometric ratio may be changed according to the determined diagnosis level.

Based on a predetermined air outlet valve opening map with respect to an air flow or an output of a fuel cell, an opening of an air outlet valve may increase or a variable range of the air stoichiometric ratio may be reduced, according to the determined diagnosis level. When the regenerative operation is performed in the third regenerative operation mode for reducing a hydrogen gas pressure on the anode side of the fuel cell stack or increasing a hydrogen stoichiometric ratio, a decreased amount in the hydrogen gas pressure on the anode side or an increased amount in the hydrogen stoichiometric ratio may be changed according to the determined diagnosis level.

In addition, based on a predetermined target hydrogen gas pressure map with respect to the air flow or the output current of the fuel cell, the target hydrogen gas pressure map may be reduced or the increased amount in the hydrogen stoichiometric ratio may be changed according to the determined diagnosis level. When Diagnosis Level 1 is determined, the regenerative operation may be performed to reduce an operating limit temperature, to increase the air pressure on the cathode side, or to reduce a variable range of the air stoichiometric ratio according to the selected regenerative operation mode.

When Diagnosis Level 2 is determined, the regenerative operation may be performed to reduce the operating limit temperature to a predetermined lower limit temperature, to increase the air pressure on the cathode side to a predetermined upper limit air pressure, to reduce the air stoichiometric ratio to a lower limit ratio, to reduce the hydrogen gas pressure on the anode side to a lower limit hydrogen gas pressure, or to increase the hydrogen stoichiometric ratio to an upper limit ratio according to which regenerative operation mode is selected. In the performing of the regenerative operation, the regenerative operation may be performed while changing the number of selected regenerative operation modes according to the determined diagnosis level.

According to an exemplary method of controlling the operation of a fuel cell system, dehydration of the fuel cell stack may be prevented and durability of a fuel cell may be improved by performing a regenerative operation when the fuel cell stack is dehydrated. In addition, degradation in performance of the fuel cell stack due to any failures occurring in the fuel cell stack or to specific operation patterns may be prevented, thereby maintaining initial operation performance of the fuel cell stack.

BRIEF DESCRIPTION OF THE DRAWINGS

The above and other objects, features and other advantages of the present invention will be more clearly understood from the following detailed description when taken in conjunction with the accompanying drawings, in which:

FIG. 2 shows a table including exemplary diagnosis levels which are classified based on degrees of water shortage severity and used in exemplary methods of controlling the operation of an exemplary fuel cell system according to an exemplary embodiment of the present invention;

DETAILED DESCRIPTION

Figure 1:
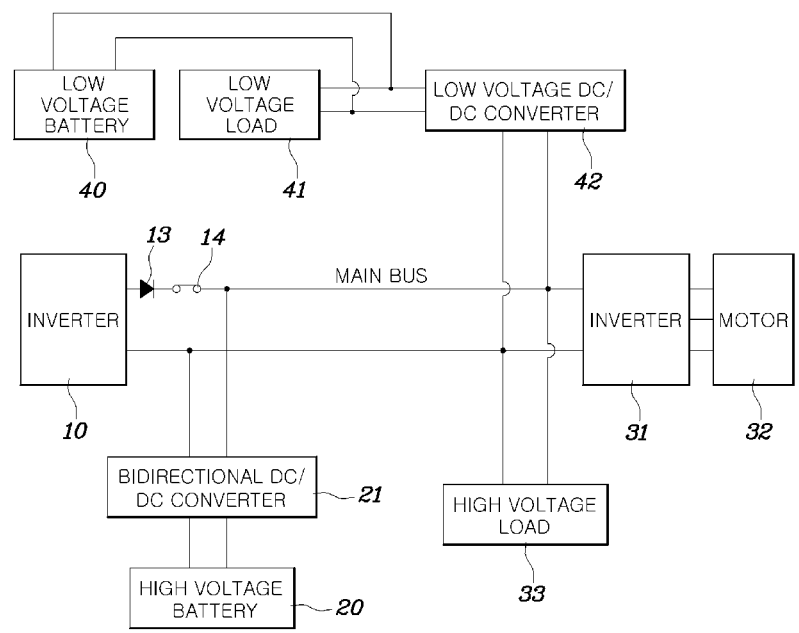
FIG. 1 illustrates an exemplary configuration of a power network of an exemplary fuel cell system according to an exemplary embodiment of the present invention.

Specific structural and functional descriptions of embodiments of the present invention disclosed herein are only for illustrative purposes of the exemplary embodiments of the present invention. The present invention may be embodied in many different forms without departing from the spirit and significant characteristics of the present invention. Therefore, the exemplary embodiments of the present invention are disclosed only for illustrative purposes and should not be construed as limiting the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Reference will now be made in detail to various exemplary embodiments of the present invention, specific examples of which are illustrated in the accompanying drawings and described below, since the embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, exemplary embodiments of the present invention will be described in detail with reference to the accompanying drawings. Throughout the drawings, the same reference numerals will refer to the same or like parts.

FIG. 1 illustrates an exemplary configuration of a power network in an exemplary fuel cell system according to an exemplary embodiment of the present invention. In particular, the fuel cell system may be operated by a controller. As illustrated in FIG. 1, a fuel cell-battery hybrid system for a vehicle may include: a fuel cell 10 used as a main power source; a high voltage battery (main battery) 20 used as an auxiliary power source which are connected in parallel to each other via a main bus terminal; a Bidirectional High Voltage direct current-direct current (DC/DC) Converter (BHDC) 21 connected to the high voltage battery 20 to control the output current of the high voltage battery 20; an inverter 31 connected to the main bus terminal on the output side of the fuel cell 10 and the high voltage battery 20; a driving motor 32 connected to the inverter 31; a low voltage battery (auxiliary battery) 40; a low voltage load 41; and a Low Voltage DC/DC Converter (LDC) 42 which is connected between the low voltage battery 40 and the main bus terminal and may be configured to convert a high voltage to a low voltage.

The fuel cell 10, as used herein, may be a main power source of a vehicle and the high voltage battery 20, as used herein, may be an auxiliary power source of the vehicle. The fuel cell 10 and the high voltage battery 20 may be connected to loads in a system such as the inverter 31 and the driving motor 32 via the main bus terminal. Additionally, the BHDC 21, connected to a terminal of the high voltage battery 20 may be connected to the main bus terminal on the output side of the fuel cell 10. Accordingly, the output current of the fuel cell 10 and the output current of the high voltage battery 20 may be adjusted by adjusting the voltage which is output to the main bus terminal of the BHDC 21.

The output terminal of the fuel cell 10 may be connected to a diode 13 configured to block a reverse current and may be connected to a relay 14 which may selectively connect the fuel cell 10 to the main bus terminal. The relay 14 may be continuously connected to the fuel cell 10 during an idling stop and at the time of a restart of the fuel cell system as well as during normal driving of a vehicle (e.g., driving without failures), and the connection thereof may be broken or disconnected during a normal shut down due to a key off operation or at the time of emergency shutting-down. The inverter 31 for rotating the driving motor 32 may be connected to the output terminal of the fuel cell 10 or the high voltage battery 20 via the main bus terminal. Therefore, the electric power from output of the fuel cell 10 or the high voltage battery 20 may be converted by phase transition and supplied to the driving motor 32, thereby causing the driving motor 32 to rotate.

In the fuel cell system, the driving motor 32 may be operated, without limitation, in any one mode among FC mode in which the output current of the fuel cell 10 is used, EV mode in which the output current of the high voltage battery 20 is used, and HEV mode in which the output current of the high voltage battery 20 is used as a subsidiary current while the output current of the fuel cell 10 is used as a main current. Particularly, during the EV mode operation, in an exemplary fuel cell system, power generation by the fuel cell 10 may be stopped when starting from the idling stop or restarting until the driving motor 32 is driven by the output current of the fuel cell 10, rotation of the driving motor 32 and driving of a vehicle may be performed by the output current of the high voltage battery 20.

During such EV mode operation, the relay 14 may be turned on and the power generation by the fuel cell 10 may be stopped due to discontinued supply of air. In this state, the output current of the high voltage battery 20 may be boosted using boosting control of the BHDC 21 connected to the output terminal of the high voltage battery 20 to increase the voltage of the main bus terminal. Therefore, loads in a vehicle such as the inverter 31 and the driving motor 32 may be operated by the output current of the high voltage battery 20. Supply of air may be suspended (e.g., discontinued or cut off) during an idling stop of the fuel cell system and resumed during a restart. When the fuel cell system starts operating in a normal operation mode after the restart, a load following control may be performed as the output current of the fuel cell 10 may change according to loads of a vehicle under normal supply of air (e.g., supply without failure or errors), and further the boosting of the BHDC 21 may be canceled or stopped.

Figure 3:
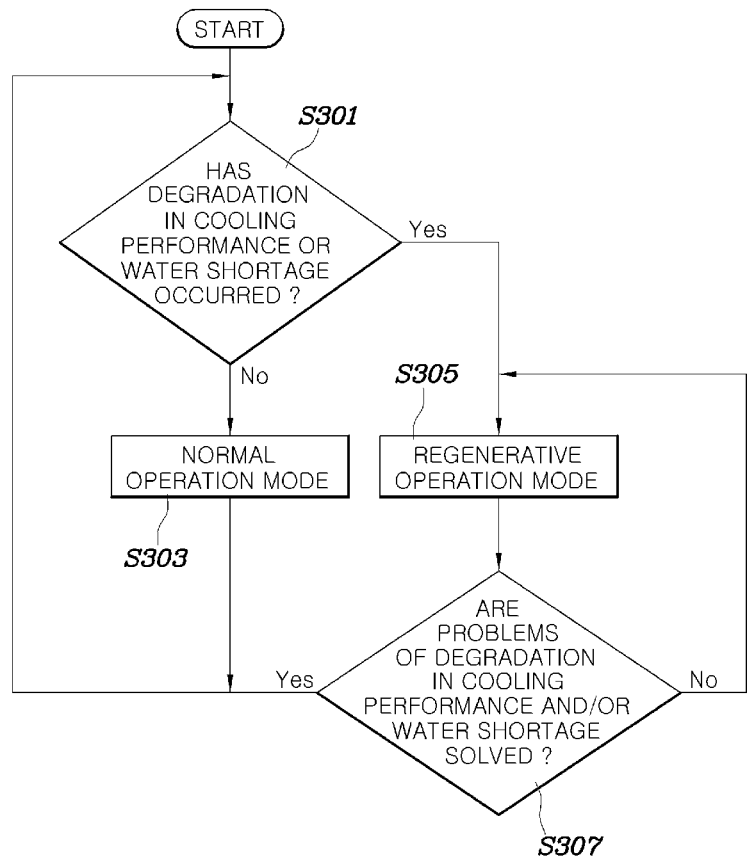
FIG. 3 shows an exemplary flow chart illustrating an exemplary method of controlling the operation of an exemplary fuel cell system based on degradation in cooling performance and occurrence of a water shortage as described in FIG. 2 according to an exemplary embodiment of the present invention.

FIG. 2 is an exemplary table including various exemplary diagnosis levels used in the method of controlling the operation of a fuel cell system and each diagnosis level is classified based on degrees of water shortage severity according to an exemplary embodiment of the present invention. FIG. 3 is a flow chart illustrating an exemplary method of controlling the operation of an exemplary fuel cell system based on degradation of heat dissipation performance and occurrence of water shortage of the fuel cell.

As shown in FIG. 2, a state of water shortage in an exemplary fuel cell stack may be determined as one of two diagnosis levels (Flt Lvls), which are Diagnosis Level 1 or Diagnosis Level 12, based on degradation in heat dissipation performance and an increase in a heat value. The higher the diagnosis level may refer to the greater the water shortage severity. In particular, when Diagnosis Level 2 (Flt Lvl 2) is determined, deterioration of the fuel cell stack may have progressed and the heat value may have been elevated. When Diagnosis Level 1 (Flt Lvl 1) is determined, the fuel cell stack may not have deteriorated yet but water shortage may occur and thus, the fuel cell stack may deteriorate. When Diagnosis Level 2 is determined, an intensity of a regenerative operation may be further enhanced than the case when Diagnosis Level 1 is determined. Accordingly, the intensity of the regenerative operation or the number of regenerative operation modes may increase according to the level of degradation or diagnosis.

When a first state where the fuel cell stack dries due to degradation in heat dissipation performance is determined, the first stage of the fuel cell stack may be determined as Diagnosis Level 1. Additionally, when a second state where the fuel cell stack dries due to an increase in the heat value of the fuel cell stack, the second state of the fuel cell stack may be determined as Diagnosis Level 2. The first state determined as Diagnosis Level 1 may be classified into the following three cases based on causes and detection methods of water shortage or degradation of cooling performance. In Case 1, a water shortage may occur due to failure of components of a cooling control system in a fuel cell system or failure of the whole cooling control system. For example, the maximum heat dissipation performance of the fuel cell system may be limited or heat dissipation performance may be degraded due to failure of components of a cooling control system or the whole cooling control system, or due to change in environmental conditions.

In particular, converging output current of the fuel cell which maintains the maximum allowable operating temperature may be reduced. Furthermore, when reduction of the output current continues, the humidity may be reduced, thereby causing a water shortage in a fuel cell stack. When the water shortage state continues, the fuel cell stack may deteriorate. Particularly, since the temperature increases in this stage, a saturated water vapor pressure may increase accordingly. However, since the output current is reduced, the volume of water produced in the fuel cell stack may be reduced, thereby causing relative humidity to substantially decrease.

When determining each case of the first state, at least one condition among a plurality of preset conditions may be satisfied. First, in Case 1, when operation is performed at limited rotating speed due to failure of a hall sensor or a three-phase current sensor, a condition of failure of a cooling water pump and a cooling fan may be determined. Further, when a flow of water directed to a radiator is not produced due to failure of a motor for adjusting a thermostat or due to failure of a thermostat opening command, a condition that adjustment of the opening of the thermostat is disabled may be determined. Accordingly, Case 1 of current water shortage state may be determined based on whether a fault signal is received from a cooling control system including a cooling water pump, a cooling fan, and a thermostat. In other words, Case 1 may be defined as a state where the operating temperature of a fuel cell system is continuously greater than a predetermined reference temperature for a predetermined period of time or longer due to failure of a cooling control system.

Moreover, Case 2 may be a state where a water shortage may occur due to a change in environmental conditions of a fuel cell vehicle. In particular, the water shortage state may be diagnosed based on a determination of whether at least any one factor among a driving speed, an uphill driving angle, and an exterior temperature of a fuel cell vehicle is greater or less than its predetermined reference value. In addition, the degree of water shortage severity may be determined when the exterior temperature of the fuel cell vehicle is increased or when the cooling performance is degraded due to reduction in a flow rate of incoming air, due to an uphill driving. In particular, the conditions for determining Case 2 may be: a state where the temperature of a fuel cell stack is greater than a predetermined first reference value is maintained for a predetermined period of time; a state where the driving speed of a fuel cell vehicle is less than a predetermined first reference driving speed; a state where the uphill driving angle of a fuel cell vehicle is greater than a predetermined first reference uphill driving angle, or a state where the exterior temperature of a fuel cell vehicle is greater than a first reference output temperature.

Since the temperature and flow rate of ram air or draft introduced into a vehicle may change with the driving speed, the uphill driving angle, or the outside temperature of a fuel cell vehicle, in Case 2, at least one factor among the driving speed, the uphill driving angle, and the exterior temperature which are factors to change the temperature and flow rate of incoming air may be greater or less than its reference value and maintain for a predetermined period of time.

In Case 3, a water shortage state which may not be determined as Case 1 or Case 2 and may be determined based on a determination of whether an integral value of current deviations between reference currents, which may be set according to the temperature of a fuel cell stack, and measured actual output currents of the fuel cell stack is greater than a predetermined first reference value, or whether a reduction amount of remaining water on the cathode side of a fuel cell stack is greater than a predetermined first reference reduction amount. Case 3 may be a state where water may be insufficient although failure of a cooling control system may not be detected or although a change in environmental conditions may not be detected. In particular, although failure of a cooling control system may not be detected, when the cooling control system substantially fails, such as shortage or leakage of cooling water, an insufficient supply of cooling water, and invasion of impurities into a cooling loop, an operating point of a fuel cell may be continuously monitored to confirm whether a substantially high temperature/low output operation continues. Accordingly, degradation in cooling performance may be recognized and a regenerative operation may be performed accordingly.

Diagnosis Level 2 may be a state where a fuel cell stack may have dried out. Diagnosis Level 2 based on the water shortage state may be determined based on the deflection and slope of a current-voltage curve of a fuel cell stack, measured impedance of a fuel cell stack, or membrane resistance measured using a Current Interrupt (CI) method. The greater the diagnosis level is the greater the progress of deterioration of a fuel cell stack. The lowest diagnosis level may be a state where a water shortage may not have occurred yet but may occur soon. The greater the diagnosis level is, the greater the degree of the water shortage severity. As the diagnosis level increases, intensity of the regenerative operation may be required to increase, for example, the number of regenerative operations performed or the intensity of a regenerative operation may increase.

As shown in FIG. 3, whether the heat dissipation performance of the fuel cell stack may have been reduced or whether the heat value of the fuel cell stack may have increased may be determined (by a controller). In other words, as illustrated in FIG. 2, the current water shortage state of the fuel cell stack may be determined as Diagnosis Level 1 or 2 (Flt Lvl 1 or 2) in Step S301. When the water shortage state of the fuel cell stack is not determined as Diagnosis 1 or 2 (Flt Lvl 1 or 2), the fuel cell system may be operated in a normal operation mode in Step S303. Alternatively, when the water shortage state of the fuel cell stack is determined as Diagnosis Level Flt Lvl 1 or 2, at least one of the possible regenerative operation modes based on the determined state may be selected and a regenerative operation may be performed in the selected regenerative operation mode in Step S305.

When the fuel cell stack recovers from the water shortage through the regenerative operation in Step S307, whether degradation in the heat dissipation performance of the fuel cell system may occur or whether the heat value of the fuel cell system may increase may be determined in Step S301. The regenerative operation mode may continue until the fuel cell stack completely recovers from the water shortage.

Figure 4A:
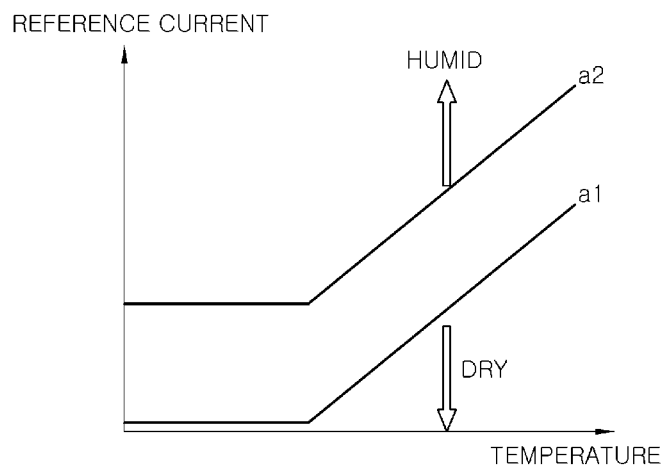
FIGS. 4A and 4B show exemplary graphs in exemplary methods of determining based on Case 3 as described in FIG. 2 according to an exemplary embodiment of the present invention.
Figure 4B:
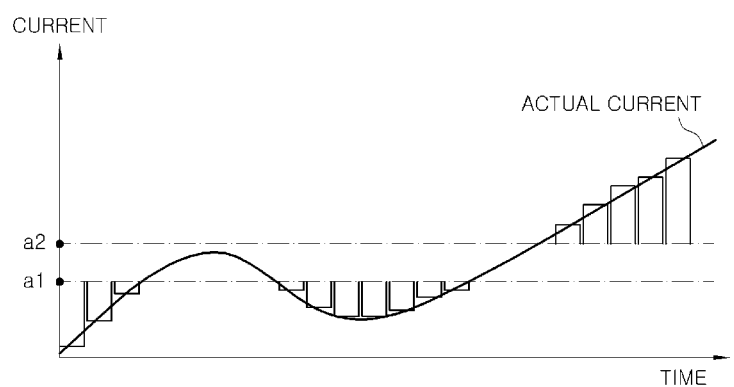

FIGS. 4A and 4B are graphs illustrating an exemplary method of determining whether the current water shortage state of the fuel cell stack corresponds to Case 3 in FIG. 2. FIG. 4A is a graph illustrating a relationship between operating temperatures of an exemplary fuel cell and predetermined reference currents. As shown in FIG. 4A, the reference current which is predetermined according to the operating temperature may not increase until the temperature is increased up to a predetermined temperature, but the reference current may proportionally increase with temperature when the temperature is increased to be greater than the predetermined temperature. Two curves in FIG. 4A may refer to two sets of reference current values which may be used with respect to hysteresis. FIG. 4B illustrates an exemplary integral calculation of deviations between the reference current values and measured actual current values. In particular, when the value from the integral calculation of deviations between the reference current values, which may be set according to the temperatures of the fuel cell stack, and actual current values of the fuel cell stack is greater than a first reference value, the water shortage state may be determined to correspond to Case 3.

The reference current value for each operating temperature may be predetermined preset, and two sets of reference current values may be set considering hysterisis. The current deviation may be a difference between the reference current value and the measured actual current value. When the actual current value is greater than a1, the deviation may be calculated by "a1—actual current value." When the actual current value is between a1 and a2, the current deviation may be about 0. When the actual current value is greater than a2, the current deviation may be calculated by "a2—measured current value." Subsequently, whether the value of an integral operation of current deviations is greater than the first reference value may be determined.

Figure 5:
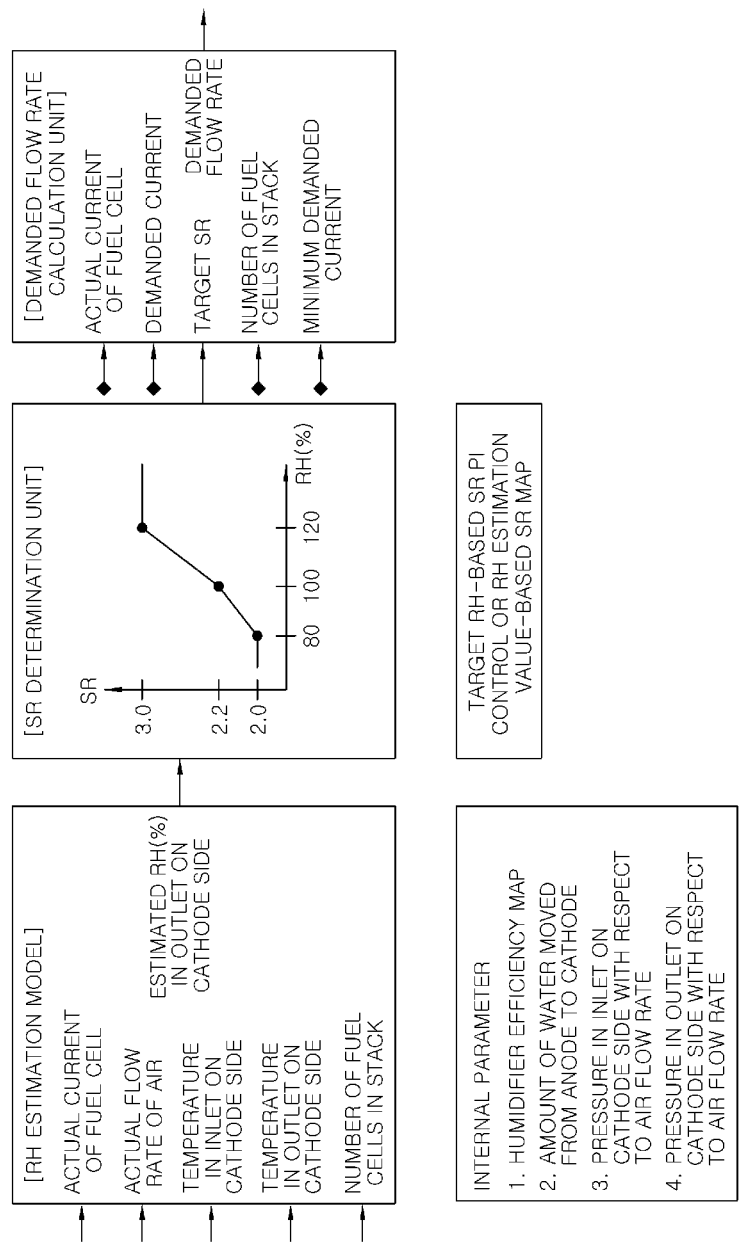
FIG. 5 shows an exemplary relative humidity estimation model and a variable controls of an air stoichiometric ratio based on the model, which may be used in another exemplary method of determining based on Case 3 as described in FIG. 2 according to an exemplary embodiment of the present invention.

FIG. 5 illustrates an exemplary relative humidity estimation model and a variable control of an air stoichiometric ratio based on the model, which may be used in a second method of determining whether a present water shortage state corresponds to Case 3 as described in FIG. 2. The second method of determining whether the water shortage stage corresponds to Case 3 may be a method of estimating the volume of remaining water in the fuel cell stack. When a reduction amount of remaining water on the cathode side of the fuel cell stack is greater than a first reference reduction amount, the present water shortage state may be determined as Case 3.

To determine whether the reduction amount of remaining water on the cathode side is greater than the first reference reduction amount, a relative humidity in the outlet on the cathode side may be obtained based on the measured output current value of the fuel cell stack, the flow rate of air in the inlet of the fuel cell stack, and the temperatures of air in the inlet and outlet on the cathode side of the fuel cell stack, and then a difference between the flow rate of water vapor in the outlet of the fuel cell stack when the relative humidity in the outlet on the cathode side may correspond to the estimated relative humidity and the flow rate of water vapor when the relative humidity in the outlet on the cathode side is saturated may be integrated into the calculation for the reduction amount of remaining water on the cathode side. The flow rate of water vapor in the outlet of the fuel cell stack may be obtained based on saturated water vapor pressures in the inlet and outlet of the fuel cell stack according to temperatures measured in the inlet and outlet of the cathode side and based on an air pressure in the outlet of the fuel cell stack based on the flow rate of air in the inlet of the fuel cell stack. When the calculated reduction amount of the remaining water is greater than the first reference reduction amount, the present water shortage state may be determined as Case 3, such that a regenerative operation mode for Case 3 may be selected.

With reference to FIG. 5, to obtain the estimated relative humidity in the outlet on the cathode side of the fuel cell stack, the flow rate of water vapor in the inlet of the fuel cell stack, the volume of produced water, and the volume of water which moves between the cathode and the anode in the fuel cell stack may be taken into consideration, and it may be assumed that there may be minimal change in the volume of remaining water on the cathode side of the fuel cell stack.

In particular, input values used to estimate the relative humidity on the cathode side may include the temperatures of air in the inlet and outlet of the fuel cell stack, the output current of the fuel cell stack, and the flow rate of air in the inlet of the fuel cell stack. The total air pressure in the inlet of the fuel cell stack may be a function of the flow rate of air in the inlet of the fuel cell stack, and the total air pressure in the outlet of the fuel cell stack may be a function of the flow rate of air in the fuel cell stack, unless otherwise indicated. The saturated water vapor pressures in the inlet and outlet of the fuel cell stack may be functions of temperatures of air in the inlet and outlet of the fuel cell stack, respectively.

To obtain the volume of remaining water in the fuel cell stack, the flow rate of water vapor in the outlet of the fuel cell stack, which may also be measured when the relative humidity in the outlet on the cathode side is about equal to the estimated value, may be calculated. The flow rate of water vapor in the outlet of the fuel cell stack may be obtained from a flow rate of dry air in the outlet of the fuel cell stack which is a difference between a flow rate of air in the inlet of the fuel cell stack and an amount of reactive oxygen, 0.6222 which is obtained by dividing a mass of 1 mole of water vapor by a mass of 1 mole of dry air, and a ratio of a water vapor pressure in the outlet of the fuel cell stack with respect to a value obtained by subtracting a water vapor pressure in the outlet of the fuel cell stack from the total air pressure in the outlet of the fuel cell stack.

Subsequently, when the relative humidity in the outlet on the cathode side is about 100%, the flow rate of water vapor in the outlet of the fuel cell stack may be calculated. A calculation method may be described above which is used when the relative humidity in the outlet on the cathode side is equal to the estimated value thereof. The reduction amount of remaining water on the cathode side may be calculated by subtracting the flow rate of water vapor in the outlet of the fuel cell stack when the relative humidity in the outlet on the cathode side is about equal to the calculated value from the flow rate of water vapor in the outlet of the fuel cell stack while the relative humidity in the outlet on the cathode side is saturated, and subsequently by integrating the resultant value with respect to time.

As illustrated in FIG. 5, a target stoichiometric ratio may be determined based on a relative humidity (RH) estimation model, using a stoichiometric ratio map in which stoichiometric ratios and estimated values of relative humidity in the outlet on the cathode side are mapped with each other, or performing a PI control of the stoichiometric ratio based on a target relative humidity. In the relative humidity (RH) estimation model, the actual output current of the fuel cell stack, the actual flow rate of air, the temperature of air in the inlet on the cathode side, the temperature of air in the outlet on the cathode side, and the number of fuel cells which constitute the fuel cell stack are input, as input values. In such a model, an efficiency map of a humidifier, the amount of water which may be transferred from the anode side to the cathode side, the air pressure in the inlet on the cathode side with respect to the air flow rate, and the air pressure in the outlet on the cathode side with respect to the air flow rate may be used as internal parameters.

Figure 6A:
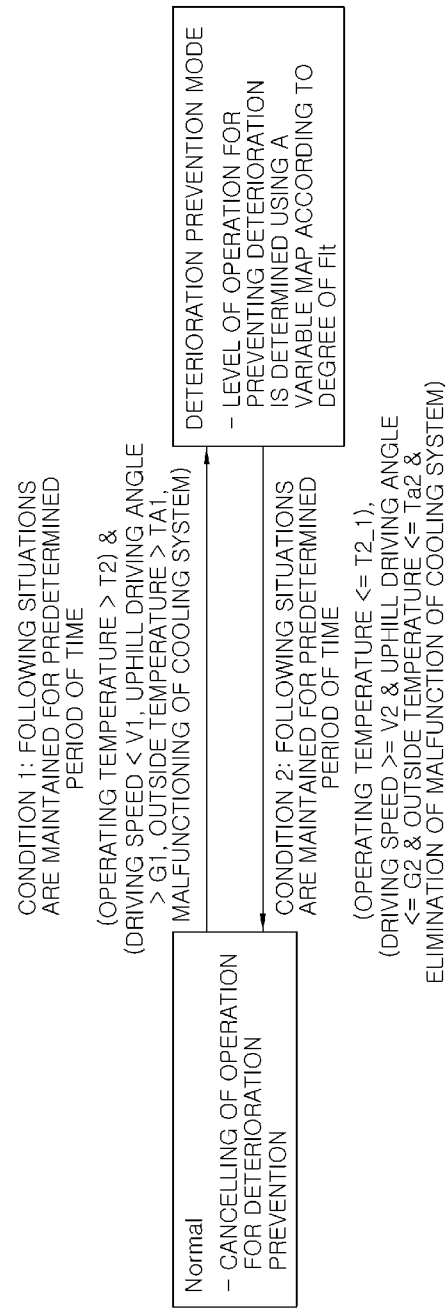
FIGS. 6A to 6C describe exemplary methods of controlling the operation of an exemplary fuel cell system according to an exemplary embodiment of the present invention.
Figure 6B:
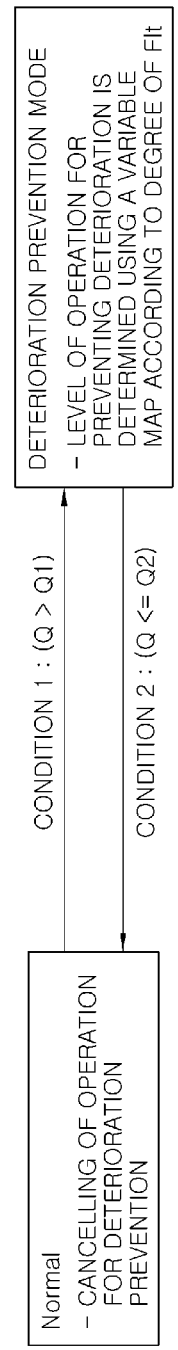
Figure 6C:
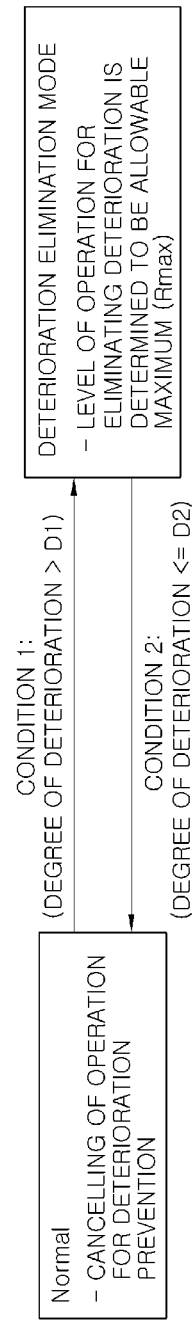

FIGS. 6A to 6C illustrate an exemplary method of controlling the operation of a fuel cell system according to an exemplary embodiment of the present invention. FIGS. 6A to 6C further illustrate switching between a normal operation mode and a regenerative operation mode. In FIG. 6A, Case 1 and Case 2 are shown and in FIG. 6B, Case 3 is shown, and in FIG. 6C Flt Lvl 2 is shown.

With reference to FIGS. 6A to 6C, the regenerative operation mode may include: a deterioration prevention mode and a stack regeneration mode. The regenerative operation mode may include: a first regenerative operation mode for reducing an operating limit temperature of a fuel cell stack; a second regenerative operation mode for increasing an air pressure on the cathode side of a fuel cell stack or reducing an air stoichiometric ratio; and a third regenerative operation mode for reducing a hydrogen gas pressure on the anode side of a fuel cell stack or increasing a hydrogen stoichiometric ratio. In Diagnosis Level 1, the regenerative operation may be performed while changing the intensity of the regenerative operation in a selected regenerative operation mode. In Diagnosis Level 2, the regenerative operation may be performed with the maximum intensity in a selected regenerative operation mode.

FIG. 6A illustrates an exemplary operation control method performed under a condition in which when an operating temperature is greater than a first reference temperature T2 and when any one of the following conditions are satisfied: a driving speed is less than a first reference driving speed V1; an uphill driving angle is greater than a first reference uphill driving angle G1; an outside temperature is greater than a first reference exterior temperature Ta1; and a signal of indicating failure of a cooling control system is received.

FIG. 6B illustrates an exemplary operation control method of performing a regenerative operation according to a determination of whether the integral value Q of current deviations is equal to or greater than a first reference integral value Q2 or not or a determination of whether the reduction amount of remaining water in a fuel cell stack is greater than a first reference reduction amount.

In other words, when the state in which the above-mentioned conditions are satisfied is maintained for a predetermined period of time during the normal operation mode, at least one regenerative operation mode among a plurality of possible regenerative operation modes may be selected and a regenerative operation may be performed in the selected regenerative operation mode. The number of regenerative operation modes and the intensity of a regenerative operation which are selected according to Diagnosis Level 1 and Diagnosis Level 2 may vary. The number of selected regenerative operation modes and the intensity of the regenerative operation may vary depending on the degree of degradation in the heat dissipation performance without bound to the diagnosis level, for example, Diagnosis Level 1. When the fuel cell stack is operated in the selected regenerative operation, the intensity of the regenerative operation may be changed according to the degree of water shortage severity.

In particular, in the selected regenerative operation mode, the regenerative operation may be performed by reducing the operating limit temperature or increasing the air pressure and reducing the air stoichiometric ratio on the cathode side, or by reducing the hydrogen gas pressure and increasing the hydrogen stoichiometric ratio on the anode side according to the selected regenerative operation mode. In addition, the number of regenerative operation modes used may be changed according to the degree of water shortage severity.

When the regenerative operation is performed in the first regenerative operation mode for reducing the operating limit temperature of the fuel cell stack, a reduction degree in the operating limit temperature may vary according to the determined diagnosis level. When the regenerative operation is performed in the second regenerative operation mode for increasing the air pressure and reducing the air stoichiometric ratio on the cathode side, an increased amount in the air pressure on the cathode side may vary and a decreased amount in the air stoichiometric ratio may vary according to the determined diagnosis level. When the regenerative operation is performed in the third regenerative operation mode for reducing the hydrogen gas pressure and increasing the hydrogen stoichiometric ratio on the anode side, a decreased amount in the hydrogen gas pressure on the anode side may vary and the hydrogen stoichiometric ratio may vary according to the determined diagnosis level.

As illustrated in FIG. 6A, when all the following conditions are satisfied and the satisfied conditions are maintained for a predetermined period of time, the selected regenerative operation mode may be canceled, the operating limit temperature is less than a second reference temperature T2_1, the driving speed is greater than a second reference driving speed V2, the uphill driving angle is greater than a second reference uphill driving angle G2, the outside temperature is less than a second reference outside temperature Ta2, and a signal that indicates malfunctioning of a cooling control system is not received.

As illustrated in FIG. 6B, when the integral value Q of current deviations may be equal to or greater than a second reference integral value Q2 or when a reduction amount of remaining water in a fuel cell stack may be equal to or less than a second reference reduction amount, the selected regenerative operation mode may be canceled.

FIG. 6C illustrates an exemplary process of switching between a normal operation mode and a regenerative operation mode according to the degree of deterioration severity of a fuel cell stack, which is may be Diagnosis Level 2. When the degree of severity of a fuel cell stack deterioration which may be calculated from a voltage-current curve of the fuel cell stack or an impedance of the fuel cell stack is greater than a first reference deterioration severity degree, the normal operation mode may switch to the regenerative operation mode. When Diagnosis Level 2 is determined, the fuel cell stack may be dried out and deteriorate accordingly, the intensity of the regenerative operation in a regenerative operation mode for regenerating the fuel cell stack from deterioration may be set to an allowable maximum value.

In particular, when Case 3 is determined, in the selected regenerative operation mode, the regenerative operation may be performed under the conditions in which the operating limit temperature is reduced to a predetermined lower limit value according to the degree of water shortage severity, the air pressure on the cathode side is increased to a predetermined upper limit value, the air stoichiometric ratio may be reduced to a lower limit value, the hydrogen gas pressure on the anode side may be reduced to a lower limit value, and thus the hydrogen stoichiometric ratio may increase to an upper limit value.

Figure 7:
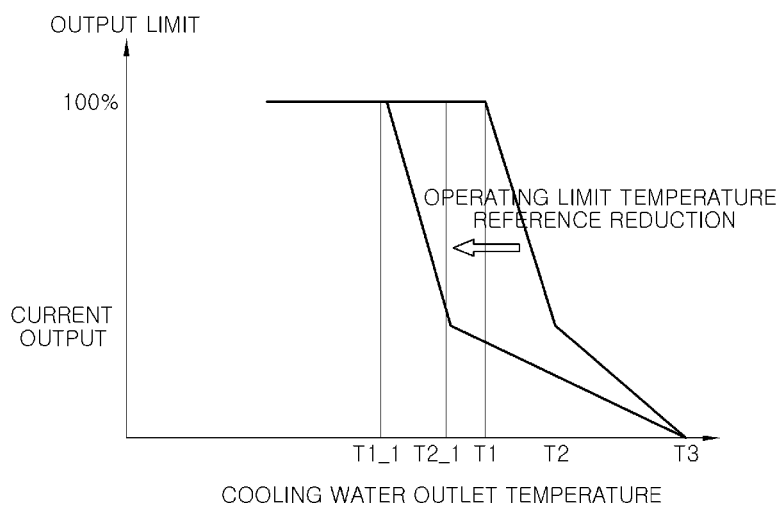
FIG. 7 shows an exemplary graph from an exemplary regenerative operation according to an exemplary embodiment of the present invention.
Figure 8:
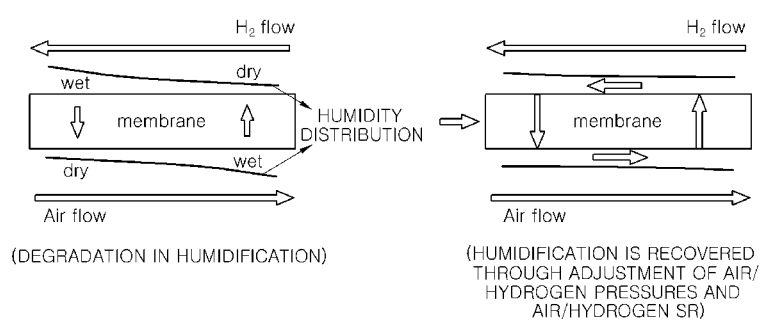
FIG. 8 illustrates another exemplary regenerative operation according to an exemplary embodiment of the present invention.
Figure 9:
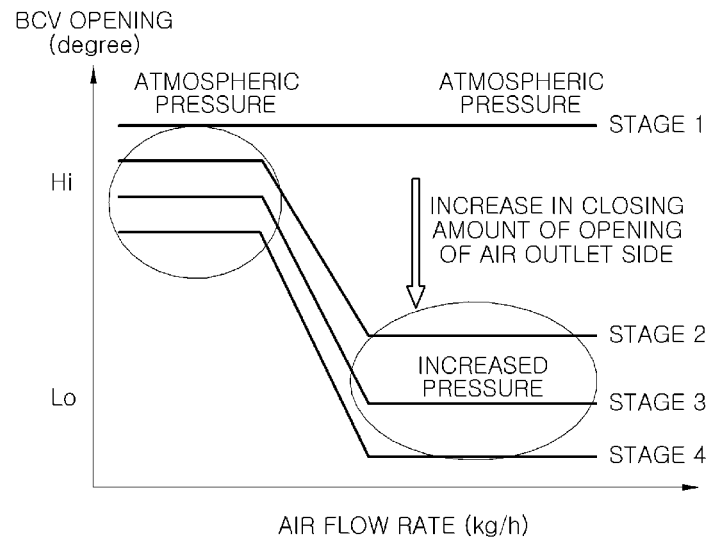
FIGS. 9 to 13 show exemplary graphs from methods of adjusting an air pressure and an air stoichiometric ratio on the cathode as shown in FIG. 8.
Figure 10:
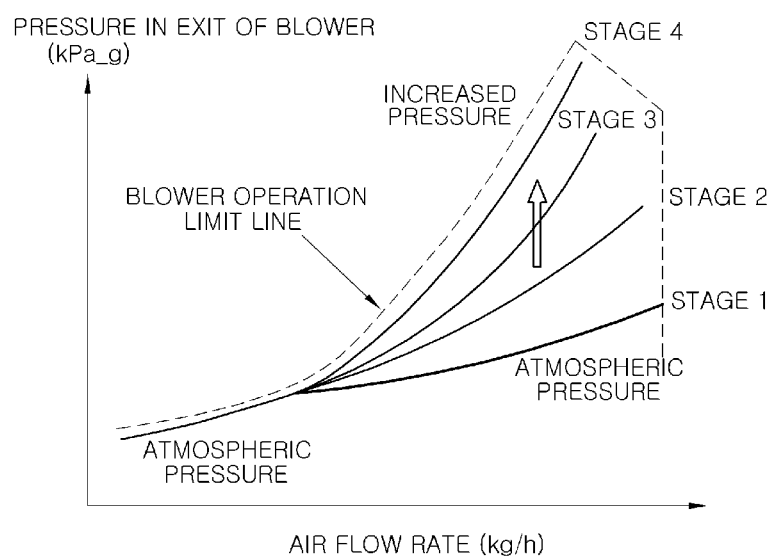
Figure 14:
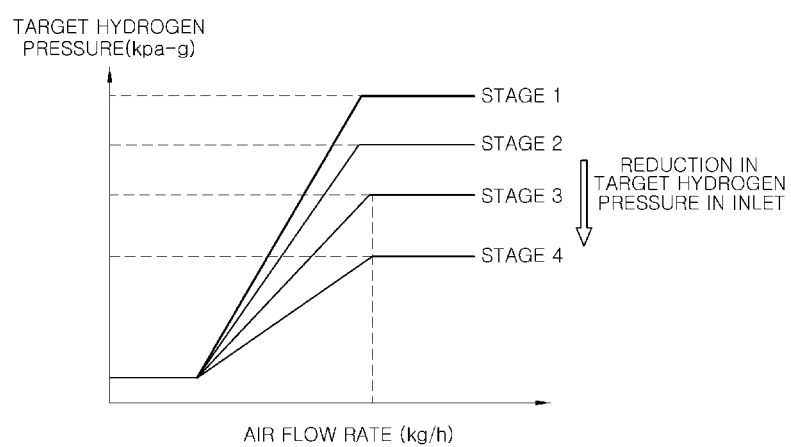
FIG. 14 also shows an exemplary graph from an exemplary regenerative operation according to an exemplary embodiment of the present invention.

FIG. 7 is a graph illustrating an exemplary regenerative operation according to an exemplary embodiment of the present invention, and FIG. 8 is a diagram illustrating an exemplary regenerative operation according to an exemplary embodiment of the present invention. FIG. 14 is a graph illustrating a further exemplary regenerative operation according to an exemplary embodiment of the present invention. A method of adjusting the volume of water in a fuel cell through forced air cooling, interruption of air supply, forced battery charging, or use of loads may not be useful in a critical situation like a high output current.

FIG. 7 illustrates an exemplary first regenerative operation mode for reducing the operating limit temperature, from among a plurality of regenerative operation modes. When the water shortage severity is determined and then the intensity of the regenerative operation is determined, or alternatively, when reduced amount of degree the operating limit temperature is determined, a high-temperature output limit reference temperature may be reduced. When the operating limit temperature is reduced, the saturated water vapor pressure may be substantially reduced and the relative humidity may be increased.

As shown in FIGS. 8 and 14, the volume of produced water to be drained out may be reduced substantially by adjusting the air and hydrogen gas pressures or the air and hydrogen stoichiometric ratios, such that internal humidification structure may be formed and the whole area of the membrane may be uniformly humidified. In particular, the volume of produced water to be drained out of the fuel cell stack may be minimized by increasing the air pressure on the cathode side and reducing the air stoichiometric ratio. In addition, the internal humidification structure which uses circulation of cooling water may be formed by reducing the hydrogen gas pressure on the anode side and increasing the hydrogen stoichiometric ratio. To reduce the hydrogen gas pressure, the stage of pressure control on the anode side may be raised, and the hydrogen stoichiometric ratio may increase subsequently according to the stage of the pressure control on the anode side.

Figure 11:
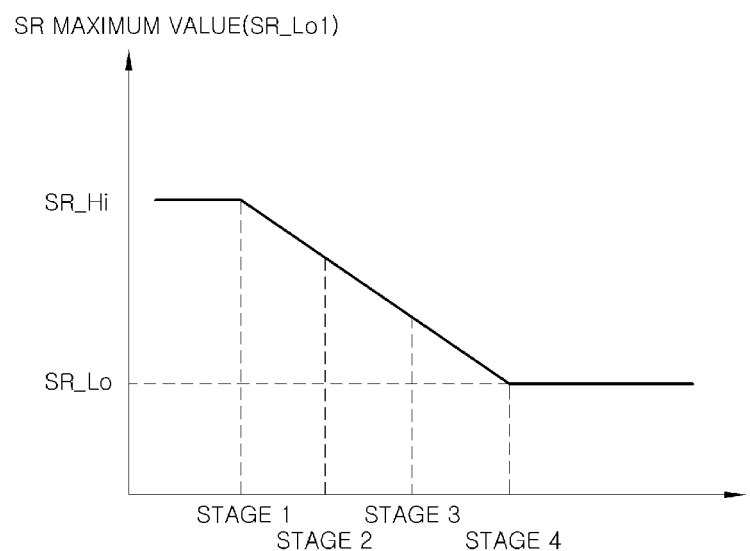
Figure 12:
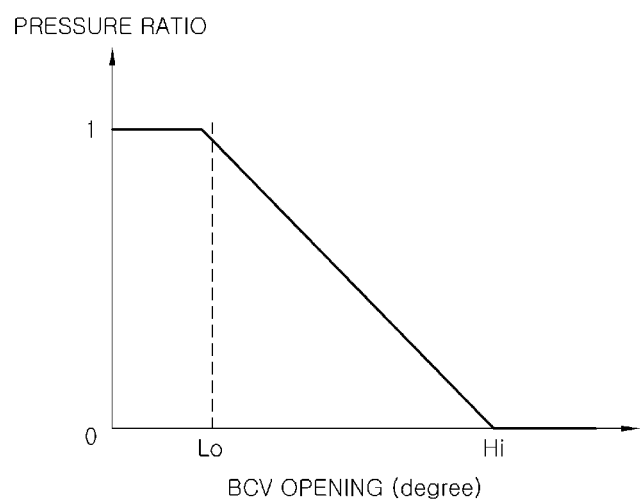
Figure 13:
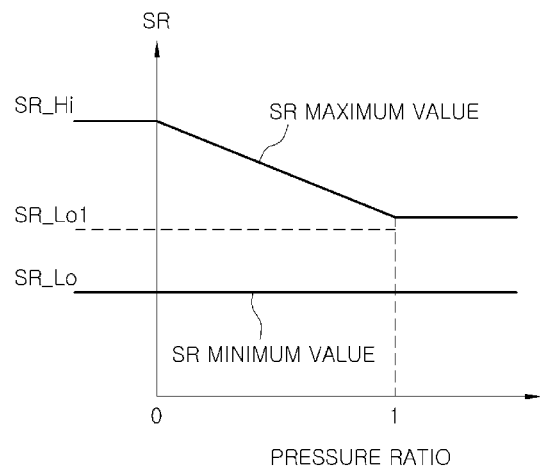

FIGS. 9 to 13 are graphs illustrating exemplary methods of adjusting the air pressure and the air stoichiometric ratio of air supplied to a cathode as shown in FIG. 8. When the intensity of the regenerative operation in the selected regenerative operation mode is determined according to the determined degree of water shortage severity, or alternatively, when an increase in the air pressure on the cathode side is determined, the stage of the pressure control on the cathode side may be increased, and the maximum value of the air stoichiometric ratio may be reduced. To increase the stage of the pressure control, the opening of a BCV on the cathode side may be reduced. At the time of increasing the pressure, the maximum value of the air stoichiometric ratio of air may be limited to SR_Lo1. As illustrated in FIG. 11, as the stage of the pressure control is increased, the SR_Lo1 may be reduced. A variable range of the stoichiometric ratio may increase at atmospheric pressure but may be reduced at increased pressure because the stoichiometric ratio may be change to prevent flooding.

Considering an overpressure period in a pressurized operation, a variable of a pressurization ratio may be used. The maximum value of the stoichiometric ratio may be linearly reduced to the SR_Lo1 during the overpressure period. A pressurization ratio may be a ratio of a difference between an actual opening and an opening command value at atmospheric pressure with respect to a difference between opening command values at atmospheric pressure and at elevated pressure.

Figure 15A:
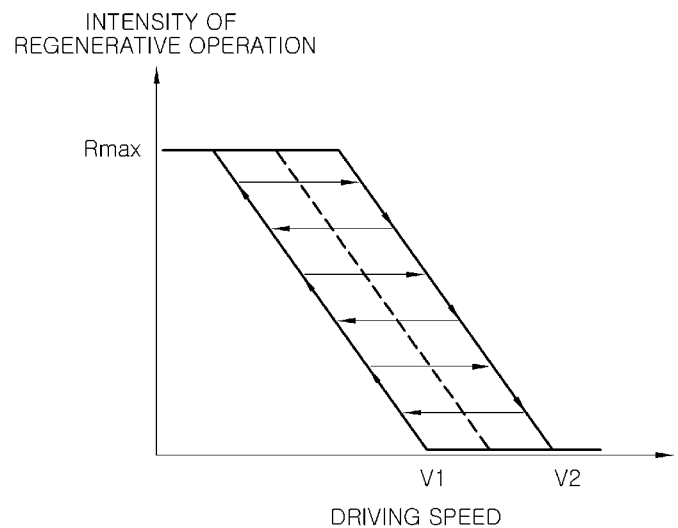
FIGS. 15A to 15C are exemplary graphs showing changes in intensity of exemplary regenerative operations according to operating conditions in exemplary methods of controlling the operation of exemplary fuel cell systems according to various exemplary embodiments of the present invention.
Figure 15B:
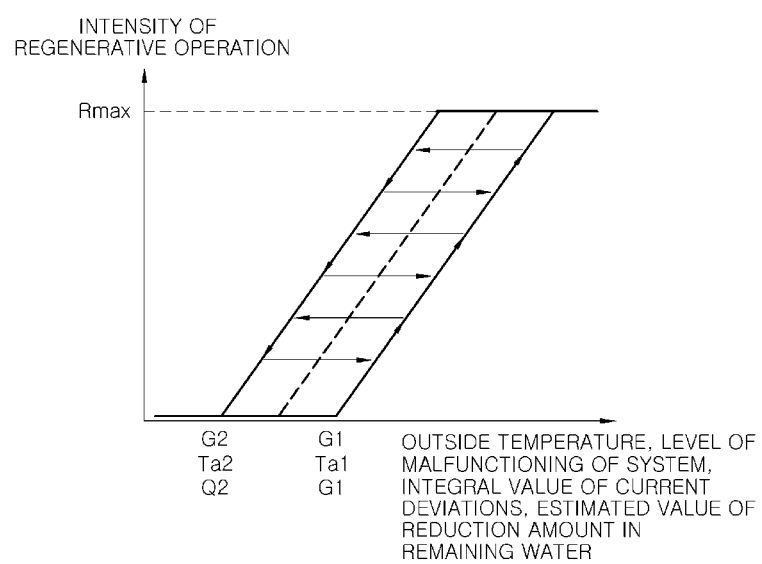
Figure 15C:
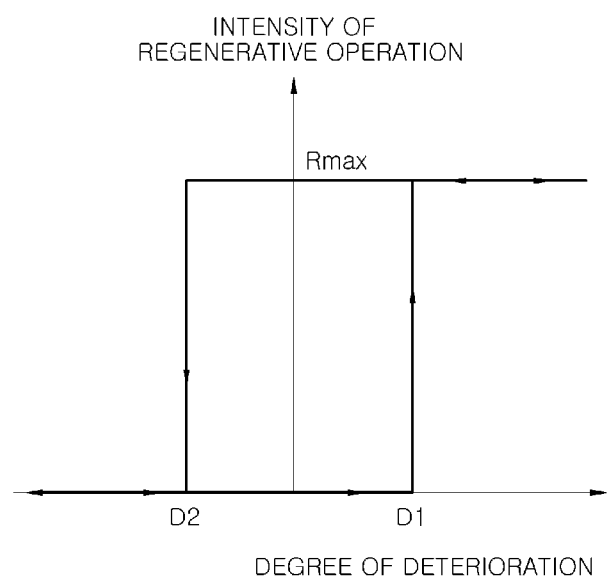

FIGS. 15A to 15C are graphs illustrating change in intensity of an exemplary regenerative operation according to operating conditions in an exemplary method of controlling the operation of a fuel cell system according to an exemplary embodiment of the present invention. FIG. 15A illustrates change in the intensity of an exemplary regenerative operation according to driving speed, FIG. 15B illustrates change in the intensity of an exemplary regenerative operation according to the exterior temperature of a fuel cell vehicle, the uphill driving angle, the degree of malfunctioning severity of a cooling control system, an integral value of current deviations, and a reduction amount of remaining water. FIG. 15C illustrates change in the intensity of an exemplary regenerative operation according to the degrees of deterioration severity of a fuel cell stack.

As shown in FIGS. 15A and 15B, the intensity of the regenerative operation may be changed to have hysteresis, according to the driving speed, the exterior temperature, the uphill driving angle, the degree of malfunction severity of a cooling control system, the integral value of current deviations, and the reduction amount of remaining water. In other words, FIGS. 15A and 15B may show exemplary regenerative operation intensity maps. As described above, the intensity of the regenerative operation may be adjusted according to the water shortage severity by adjusting the operating limit temperature, the air pressure and air stoichiometric ratio on the cathode side, and the hydrogen gas pressure and hydrogen stoichiometric ratio on the anode side. In addition, FIGS. 15A and 15B illustrate an exemplary method of linearly increasing the intensity of the regenerative operation according to the degree of water shortage severity, but the intensity of the regenerative operation may nonlinearly increase.

Meanwhile, in FIG. 15C, the intensity of the regenerative operation may be determined as an allowable upper maximum value when the regenerative operation is necessary, for example, when the degree of deterioration severity may be equivalent to a first reference deterioration severity value D1 or greater.

According to various exemplary embodiments, the intensity of the regenerative operation may be reduced and the number of regenerative operation modes may be reduced, when Flt Lv1 is reduced and the degree of water shortage severity of the fuel cell stack is reduced. Furthermore, the regenerative operation modes may be selectively operated according to the degree of water shortage severity of a fuel cell stack when an air/fuel ratio is reduced or an acceleration response is reduced.

Although the present invention has been described with reference to exemplary embodiments illustrated in the drawings for illustrative purposes, those skilled in the art will appreciate that various modifications and equivalent embodiments are possible, without departing from the scope and spirit of the invention. Accordingly, the substantial technical protection scope of the present invention will be defined by the appended claims.

What is claimed is:

1. A method of controlling operation of a fuel cell system that performs a regenerative operation according to respective states of a fuel cell stack, comprising steps of:

diagnosing, by a controller, a water shortage state in a fuel cell stack based on degradation of cooling performance and deterioration of the fuel cell stack;

determining, by the controller, a diagnosis level of the fuel cell system based on the diagnosed water shortage state of the fuel cell stack;

performing, by the controller, the regenerative operation with an intensity of the regenerative operation which corresponds to the determined diagnosis level to prevent deterioration of the fuel cell stack by predicting deterioration of the fuel cell stack and to regenerate the fuel cell stack when the fuel cell stack is deteriorated; and controlling, by the controller, a cooling system or a hydrogen/air supply system according to the regenerative operation, wherein in the determining of the fuel cell system, a first state where the fuel cell stack is not deteriorated yet, but a water shortage due to degradation in cooling performance is predicted to occur is determined as Diagnosis Level 1, wherein in the determining of the fuel cell system, a second state where the fuel cell stack is deteriorated due to a water shortage and where a heat value of the fuel cell stack is increased is determined as Diagnosis Level 2, wherein the higher diagnosis level means the greater water shortage severity, wherein the deterioration of the fuel cell stack is determined based on a voltage-current curve of the fuel cell stack or an impedance or current interruption method with respect to the fuel cell stack, wherein the regenerative operation includes a first regenerative operation for reducing an operating limit temperature of the fuel cell stack; a second regenerative operation for increasing an air pressure on the cathode side of the fuel cell stack or reducing an air stoichiometric ratio; and a third regenerative operation for reducing a hydrogen gas pressure on an anode side of the fuel cell stack or increasing a hydrogen stoichiometric ratio such that at least one regenerative operation among the first regenerative operation, the second regenerative operation, and the third regenerative operation is selected, and wherein, in Diagnosis Level 1, the regenerative operation is performed while changing the intensity of the regenerative operation in a selected regenerative operation and in Diagnosis Level 2, the regenerative operation is performed with maximum intensity in the selected regenerative operation.

2. The method according to claim 1, wherein the first state includes a state where a water shortage in the fuel cell stack due to malfunctioning of the cooling system is predicted.

3. The method according to claim 2, wherein the first state is a state where an operating temperature of the fuel cell system is a predetermined reference temperature or greater and where malfunctioning of the cooling system continues for a predetermined period of time.

4. The method according to claim 1, wherein the first state includes a state where a water shortage in the fuel cell stack due to increase or decrease in a temperature or a flow rate of a draft is predicted, and wherein the first state is a state where at least any one factor among a driving speed of a vehicle, an uphill driving angle, and an exterior temperature is continuously greater or less than a predetermined reference value for a predetermined period of time.

5. The method according to claim 4, wherein the first state is a state where the driving speed is continuously less than a first reference driving speed for a predetermined period of time, or the uphill driving angle is continuously greater than a first reference uphill driving angle for the predetermined period of time, or the exterior temperature is continuously greater than a first reference outside temperature for the present period of time.

6. The method according to claim 1, wherein the first state is determined based on a determination of whether a value calculated using a reference current of the fuel cell stack and a measured current of the fuel cell stack is greater than a first reference value, the reference current being is determined according to a temperature of the fuel cell stack and the measured current is determined as an actual current output from the fuel cell stack.

7. The method according to claim 6, wherein the reference current increases with the temperature of the fuel cell stack.

8. The method according to claim 1, wherein the first state is determined based on a change in an amount of remaining water on a cathode side, the amount of change being calculated using an estimated value of relative humidity on the cathode side of the fuel cell stack.

9. The method according to claim 8, wherein the estimated value of relative humidity on the cathode side of the fuel cell stack is obtained based on temperatures in an inlet and an outlet on the cathode side of the fuel cell stack, an air flow rate in an inlet of the fuel cell stack, and a produced current which is output from the fuel cell stack.

10. The method according to claim 8, wherein the change in the amount of remaining water is calculated using a flow rate of water vapor in the outlet on the cathode side when the relative humidity in the outlet on the cathode side is about equal to the estimated value of the relative humidity and using a flow rate of water vapor in the outlet on the cathode side when the relative humidity in the outlet on the cathode side is within a range of from about 90% to about 110%.

11. The method according to claim 8, wherein the flow rate of water vapor in the outlet on the cathode side is calculated using a water vapor pressure in the outlet on the cathode side, an air pressure in the outlet on the cathode side which depends on the air flow rate in the inlet of the fuel cell stack, and the air flow rate in the inlet of the fuel cell stack.

12. The method according to claim 1, wherein when the regenerative operation is performed in the first regenerative operation for reducing the operating limit temperature of the fuel cell stack, the operating limit temperature is changed according to the determined diagnosis level.

13. The method according to claim 1, wherein when the regenerative operation is performed in the second regenerative operation for increasing the air pressure on the cathode side or reducing the air stoichiometric ratio, an increased amount in air pressure on the cathode side or a decreased amount in the air stoichiometric ratio is changed according to the determined diagnosis level.

14. The method according to claim 13, wherein based on a determined air outlet valve opening map with respect to an air flow or an output of a fuel cell, an opening of an air outlet valve increases or a variable range of the air stoichiometric ratio is reduced according to the determined diagnosis level.

15. The method according to claim 1, wherein when the regenerative operation is performed in the third regenerative operation for reducing the hydrogen gas pressure on the anode side of the fuel cell stack or increasing the hydrogen stoichiometric ratio, a decreased amount in the hydrogen gas pressure on the anode side or an increased amount in the hydrogen stoichiometric ratio is changed according to the determined diagnosis level.

16. The method according to claim 15, wherein based on a preset target hydrogen gas pressure map with respect to the air flow or an output of the fuel cell, the target hydrogen gas pressure map is reduced or an increased amount in the hydrogen stoichiometric ratio is reduced according to the determined diagnosis level.

17. The method according to claim 1, wherein when Diagnosis Level 1 is determined, the regenerative operation is performed to reduce an operating limit temperature, to increase the air pressure on the cathode side, or to reduce a variable range of the air stoichiometric ratio according to the selected regenerative operation.

18. The method according to claim 1, wherein when Diagnosis Level 2 is determined, the regenerative operation is performed to reduce an operating limit temperature to a predetermined lower limit temperature, to increase the air pressure on the cathode side to a preset upper limit air pressure, to reduce the air stoichiometric ratio to a lower limit air stoichiometric ratio, to reduce the hydrogen gas pressure on the anode side to a lower limit hydrogen gas pressure, or to increase the hydrogen stoichiometric ratio to an upper limit hydrogen stoichiometric ratio according to the selected regenerative operation.

19. The method according to claim 1, wherein in the performing of the regenerative operation, the regenerative operation is performed while changing the number of selected regenerative operations according to the determined diagnosis level.

* * * * *